July 9, 1957
B. F. GROSH
2,798,679
SPIN CASTING REEL
Filed Nov. 23, 1953
2 Sheets-Sheet 1
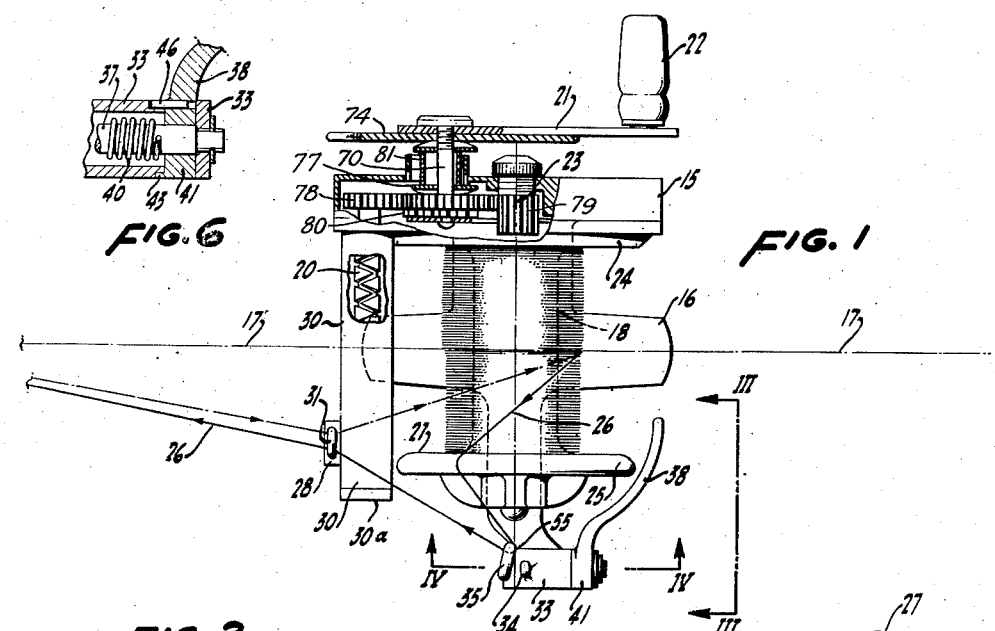
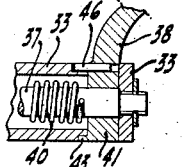
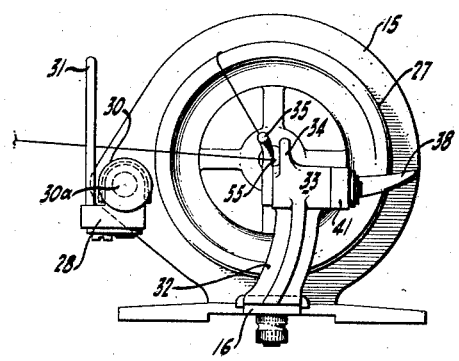
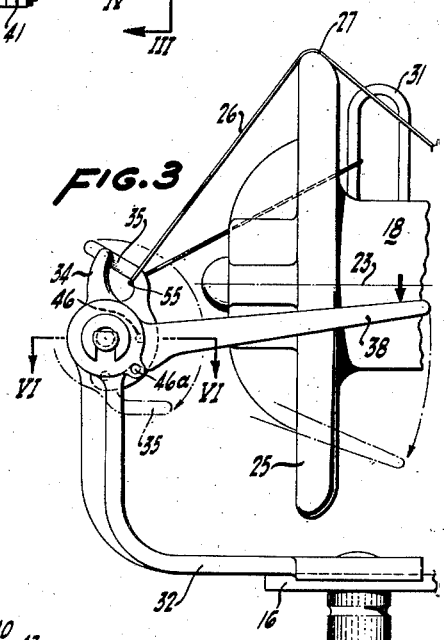
INVENTOR.
BENJAMIN F. GROSH
BY
Henry Gifford Hardy
ATTORNEY July 9, 1957   B. F. GROSH   2,798,679
SPIN CASTING REEL
Filed Nov. 23, 1953   2 Sheets-Sheet 2
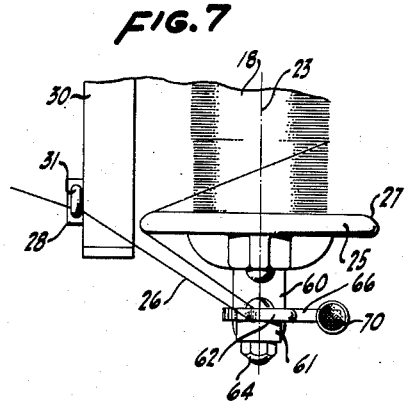
FIG. 7
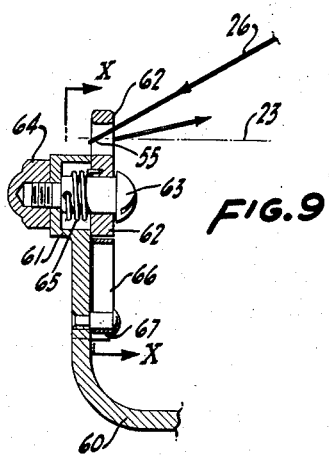
FIG. 9
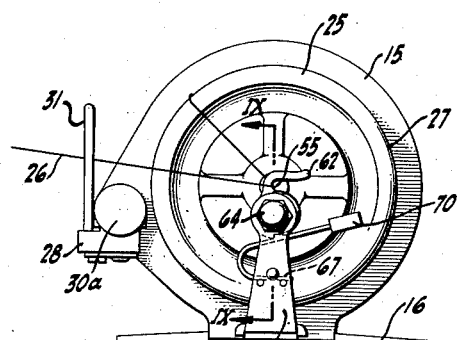
FIG. 8
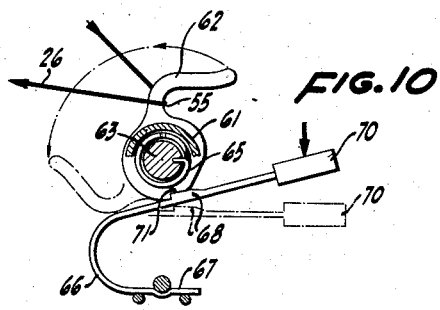
FIG. 10
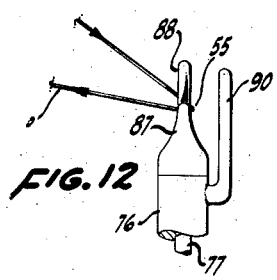
FIG. 12
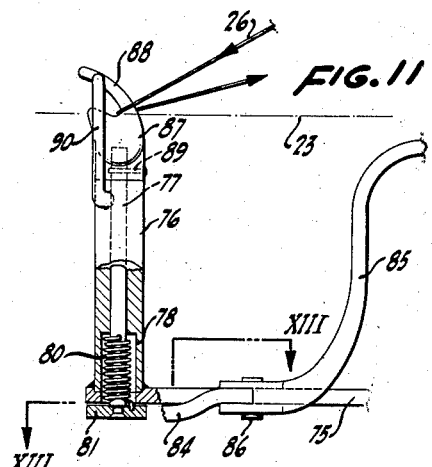
FIG. 11
FIG. 13
INVENTOR.
BENJAMIN F. GROSH
BY
Henry Gifford Hardy
ATTORNEY 2,798,679
      SPIN CASTING REEL Benjamin F. Grosh, Portland, Oreg.

Application November 23, 1953, Serial No. 393,851

2 Claims. (Cl. 242—84.21)

This invention relates to fishing reels and particularly to spin casting reels.

In spin casting, the drum or spool on which the line is wound remains stationary and the line slides or spins off of one end of the spool, instead of having the spool revolve with the line being payed off tangentially during rotation. Because of this feature the line is delivered during the cast with a minimum of resistance and without the inertia and friction of the rotating spool.

Spin casting reels have the disadvantage, however, that the line is required to make a sharp right angle bend around a guide arm or eyelet adjacent the free end of the spool and before the line reaches the pole eyelets, which is necessary to eliminate backlashing of the line and snarling of the same during the casting. The fact that such assistance is needed in the paying out of the line during the cast, as shown in presently available devices, correspondingly necessitates the retracing of the line through the guide means during the take-up or winding operation. This not only results in a high frictional drag, but also imposes a severe stress upon the line. Accordingly, it is an object of the present invention to provide an improved spinning reel which has all of the advantages required of a reel for spin casting, and also has the advantage of providing a level wind tangentially upon the spool during the take-up or winding operation.

Another advantage of the present invention is the provision of a spin casting reel wherein the spool remains at all times in the same position with respect to the fishing rod, and yet the line may be spun off the open end of the spool during casting and level wound tangentially during the take-up or retrieving operation.

Another object of the present invention is to provide a spin casting reel wherein the line will spin out on a guide during the casting, and, at the same time, provide the fisherman with the means for instantaneously releasing this guide at any moment he may desire.

It is a further object of the present invention to provide a releasable guide means which can be instantaneously disengaged and freed in such a manner as to be free of the line, no matter the position of the line along the perimeter of the open end of the spool at the time of the release.

Applicant has found that it is quite impossible to secure trouble-free casts with spin casting reels unless it is associated with and wound by a cooperating, integrated level-wind mechanism, cantilever mounted in the same manner as the spool itself.

It is another object of the present invention to provide a level-wind mechanism mounted to operate in a cantilevered, supported tube.

Further objects are to provide a construction of maximum simplicity, economy and ease of manufacture, and, also, such further objects, advantages and capabilities as will more fully appear and as are inherently possessed by the device and invention described herein.

The invention further resides in the combination, construction and arrangement of parts illustrated in the accompanying two sheets of drawings, and, while there is shown therein a preferred embodiment and two variations thereof, it is to be understood that the same is merely illustrative of the invention and that the invention is capable of modification and change and comprehends other details of construction without departing from the spirit thereof or the scope of the appended claims.

Referring to the drawings:

Figure 1 is a top plan view of the spin casting reel of the present invention with the horizontal broken line representing the axis of the fishing rod in normal relation.

Figure 2 is a side elevation of the reel looking toward the open end of the spool.

Figure 3 is an enlarged detail showing the guide hook mechanism for the line and its release, taken on the line III—III of Figure 1 and looking in the direction of the arrows.

Figure 4 is a fragmentary sectioned detail taken on the line IV—IV of Figure 1.

Figure 5 is a sectioned detail showing the spring latch taken on the line V—V of Figure 4.

Figure 6 is a detail of the hook release means taken on the line VI—VI of Figure 3.

Figure 7 is a fragmentary plan view of a modification of the release means for the spin casting reel.

Figure 8 is an end elevational view of the spin casting reel with the modified hook and release means, looking toward the open end of the reel.

Figure 9 is an enlarged sectional view of the hook and release means shown in Figures 7 and 8, taken on the line IX—IX of Figure 8.

Figure 10 is a diagrammatic enlarged view of the modified hook guide means shown in Figures 7 and 8 with the release mechanism and the release position shown in dotted lines.

Figure 11 is still another modification of the hook guide and release means shown partly in rear elevation and partly in vertical section.

Figure 12 is an enlarged detail of the guide hook and line retainer shown in Figure 11, but in side elevation.

Figure 13 is an enlarged detail in top plan taken on the line XIII—XIII of Figure 11.

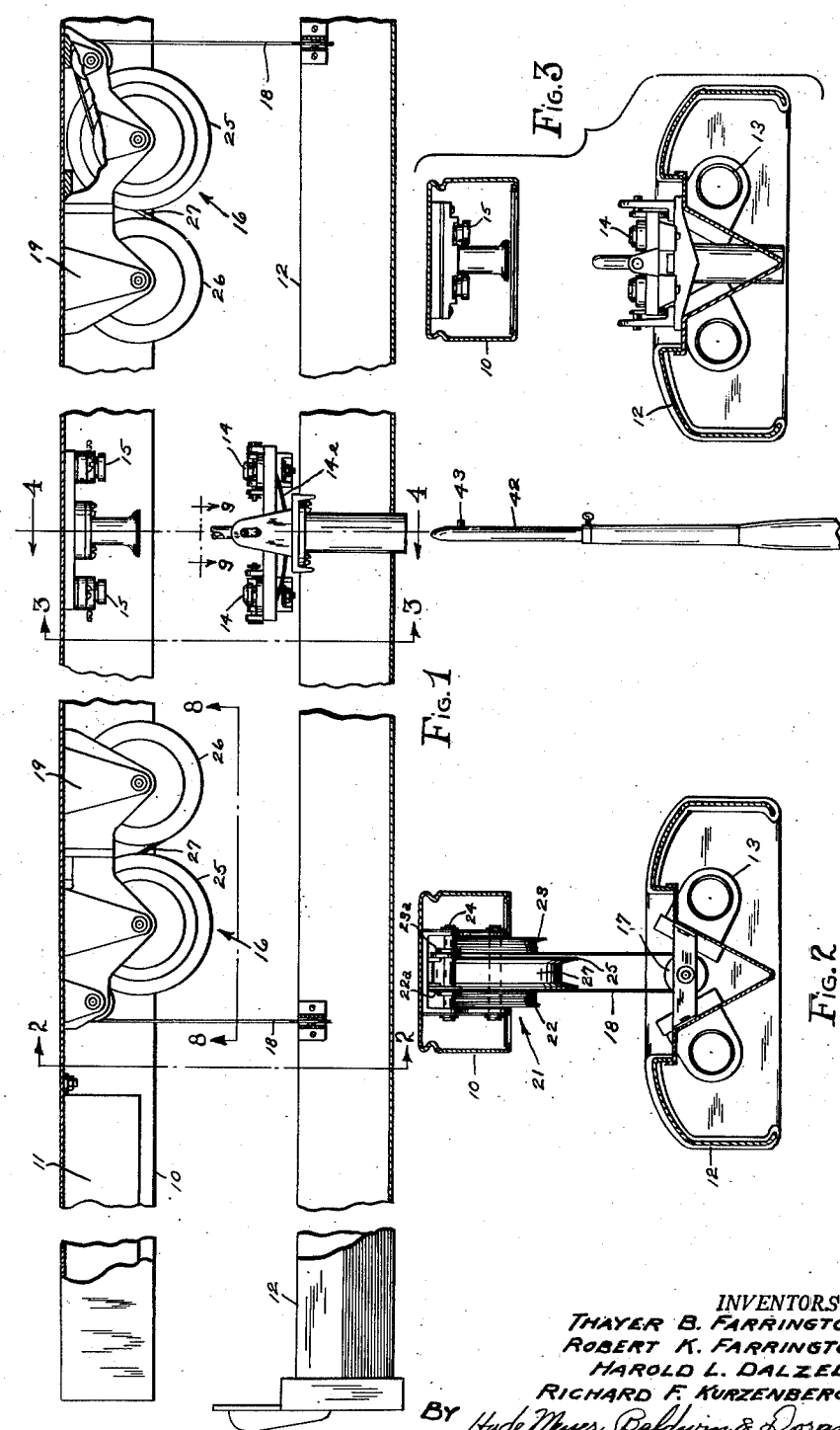

Now, referring more particularly to the drawings, in which like reference numerals indicate like parts in the several views, and with particular reference to Figure 1 which shows the reel of this invention in top plan view, it consists of a general framework, including the gear housing 15 connected integrally to a mounting plate 16 by means of which the reel is attached in the usual manner adjacent the handle of the fishing rod. The broken line 17 indicates the center line of the fishing rod to which the reel is intended to be attached. The gear housing 15 contains the conventional gear trains for simultaneously rotating not only the spool 18 of the reel but the double, reversing worm 20 of the level winding unit. The gear train (not shown) is operated in the usual manner by turning the crank 21 by means of the knob 22. As shown by the broken lines in Figure 1, the spool 18 is mounted for rotation on the gear housing 15 so that the axis 23 of the spool is at right angles to the center line of the fishing rod indicated at 17. The spool 18 is provided, as is conventional, with an inner head 24 and an outer head 25. As shown in Figure 1, the fishing line 26 is wound tangentially on the spool 18 between the inner faces of the inner head 24 and the outer head 25. The outer head 25 has its perimeter rounded and so shaped as to facilitate the passage of the line 26 thereover, no matter from what position on the spool the line is being payed out. It will be noted that the spool 18 is cantilever mounted so that the outer end, including head 25, is free around its entire circumference to permit the line 26 to